(No Model.)

I. W. RICHARDS.
LAWN MOWER.

No. 384,787. Patented June 19, 1888.

WITNESSES:
Morris A. Clark.
F. W. Combs.

INVENTOR.
Ivan W. Richards.
per Hallock & Halleck
Attys.

United States Patent Office.

IVAN W. RICHARDS, OF COLORA, MARYLAND.

LAWN-MOWER.

SPECIFICATION forming part of Letters Patent No. 384,787, dated June 19, 1888.

Application filed April 20, 1887. Serial No. 235,527. (No model.)

*To all whom it may concern:*

Be it known that I, IVAN W. RICHARDS, a citizen of the United States, residing at Colora, in the county of Cecil and State of Maryland, have invented certain new and useful Improvements in Lawn-Mowers; and I do hereby declare the following to be a full, clear, and exact description of the invention, such as will enable others skilled in the art to which it appertains to make and use the same.

My invention relates to that class of grass-cutters or lawn-mowers which are provided with horizontal cutting-disks, and has for its object the improvement of such devices; and to that end the invention consists of constructions and combinations, all as will hereinafter be described and claimed, whereby the objects of the invention are accomplished.

Figure 1:
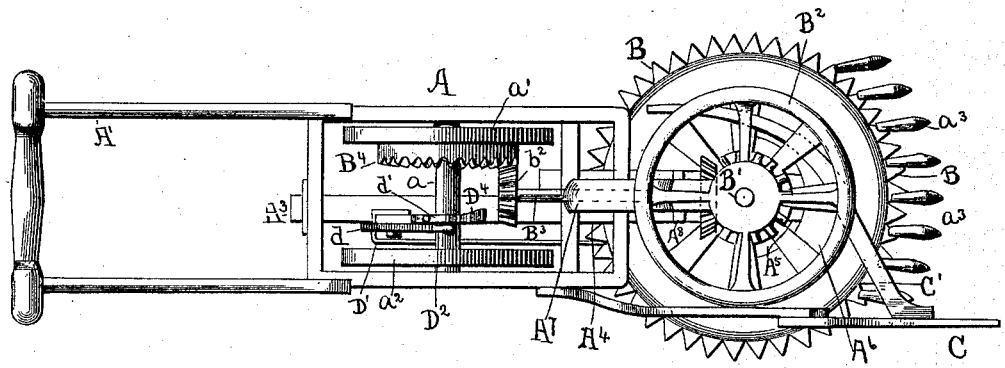
Figure 2:
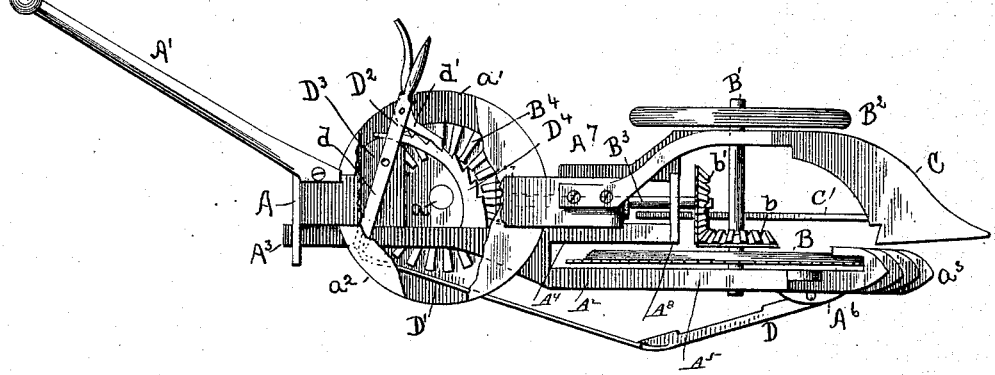

Referring to the drawings which form part of the specification, Figure 1 represents a top plan view; and Fig. 2, a side elevation, with part of the frame and one of the wheels broken away to show the stop mechanism of part of the machine.

A represents a frame having shaft $a$, wheels $a'$ $a^2$, handle A', and a forwardly-projecting cutter-carrying frame, $A^2$. The supporting-beam $A^3$ of this frame is secured to the under side of the frame A, and the forward part consists of a short upper arm, $A^4$, and long lower arm, $A^5$, immediately under the other and provided with a portion, $A^6$, having bent fingers $a^3$, between which the grass passes and is acted upon by the cutter-disk. This disk is provided with a vertical shaft, B', stepped or otherwise journaled in arm $A^5$ at its lower end and journaled near its upper end in a bracket, $A^7$, supported by an upright, $A^8$, on arm $A^4$ and the top of the frame A.

Upon the upper end of the shaft is secured a balance-wheel, $B^2$, which gives a regular motion to the cutter-disk, and also by its movement causes the disk to act positively, and thus prevent the spaces between the fingers from becoming choked. Above the cutter-disk and secured to the shaft B is a bevel-wheel, $b$, which gears with a bevel-wheel, $b'$, on shaft $B^3$, journaled in the frame A and upright $A^8$. Upon the end of the shaft opposite to wheel $b'$ is secured a bevel-wheel, $b^2$, gearing with a crown-wheel, $B^4$, secured in any suitable manner upon the axle of the frame A. In the present instance it forms part of wheel $a'$, so that when the machine is moved forward the wheel will operate the cutter-disk through the gearing just described.

C represents a divider rigidly secured to the front end of the frame A, and which projects forward over the cutter-disk. It is provided with the curved grass-deflector C', which guides the grass out of the way as fast as the latter is cut.

At the forward end of the arm $A^5$ is pivoted a runner, D, which projects rearward and slides over the grass as the mower is moved back and forth. To the rear end of the runner is pivoted the front end of a rod, D', which is also pivoted at its rear end to the arm $d$ of a lever, $D^2$, on beam $A^3$. The beam also supports a curved rack-bar, $D^4$, for the pawl $d'$ in the lever $D^2$. This pawl, according to the tooth that it is in contact with, regulates the position of the runner relative to the forward part of the machine. If the pawl be in contact with one of the lower teeth of the rack-bar, the end of the runner pivoted to the rod D' will be near the under side of the forward part of the mower. If the pawl be shifted to one of the upper teeth, by drawing the lever back the rear end of the runner will be moved away from the under side of the forward part of the mower. This is due to the fact that the movement of the lever to draw the pawl away from the lower tooth also forces the rod D' toward the front part of the machine. This rod, as before stated, being pivoted at its front end to the rear end of the runner, forces the rear end of the latter away from the under side of the front part of the machine. This part of the machine is raised by pressing down upon the handles, so that the rod can then have free action upon the runner. As soon as the runner is adjusted the desired distance, the forward part of the machine is lowered, and the weight of the latter rests upon the runner and acts through the rod and lever upon the pawl, which is thereby held in contact with the rack-bar.

If it be desired to lower the front part of the machine, the pawl is removed from contact with the rack-bar and the weight of the forward part of the machine will press upon the runner until the rear end of the latter is near or in contact with the under side of the machine and at the same time force the rod D' backward and the upper end of the lever forward. By these means the distance of the disk-cutter from the ground may be regulated by the operator without leaving the handle end of the machine to adjust the mechanism, which is a very desirable feature in a machine when the ground is uneven.

What I claim as new is—

In a lawn-mower, the combination of a frame having the forward-projecting part carrying the cutter-disk and a curved rack-bar at the rear end, a runner pivoted to the under side of the forward-projecting part and extending toward the rear of the frame, a lever, $D^2$, fulcrumed upon the frame and having a pawl for said rack-bar, and a rod connecting the runner and lever, for the purpose set forth.

In testimony whereof I affix my signature in presence of two witnesses.

I. W. RICHARDS.

Witnesses:
 GEO. R. BYINGTON,
 F. W. COMBS.